Figure 1:
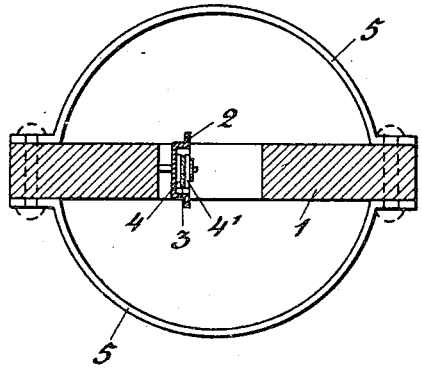

Inventors
Wilhelm Rudolph and
Alard du Bois-Reymond by Knight Bro
Attorneys

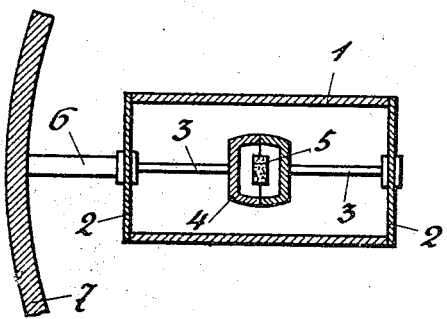
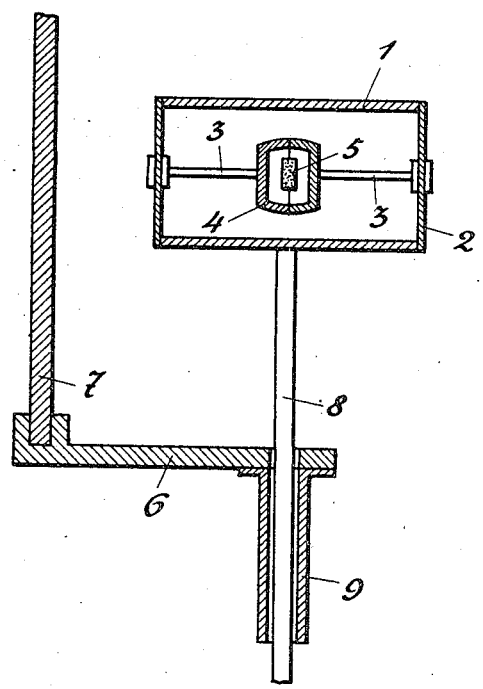

Inventors
Wilhelm Rudolph and
Alard du Bois-Reymond
by Knight Bros
Attorneys

Patented July 19, 1927.

1,636,576

UNITED STATES PATENT OFFICE.

WILHELM RUDOLPH, OF KIEL, AND ALARD du BOIS-REYMOND, OF PLON, NEAR KIEL, GERMANY, ASSIGNORS TO THE FIRM SIGNAL GESELLSCHAFT M. B. H., OF KIEL, GERMANY.

SOUND-DIRECTION FINDER.

Application filed February 4, 1921, Serial No. 442,584, and in Germany May 29, 1915.

(GRANTED UNDER THE PROVISIONS OF THE ACT OF MARCH 3, 1921, 41 STAT. L., 1313.)

Devices for ascertaining the direction from which a train of sound waves arrives are known, the construction of which is based on the interference principle or upon the focussing or reflection of a directed bunch or pencil of sound waves.

These sound receivers, if they are to be effective, cannot be made small in comparison with the wave length of the particular sound waves employed. On account of their large size considerable difficulty is involved in their construction and manipulation.

In another kind of arrangement for ascertaining the direction of sound, a number of independent receivers are placed at a considerable distance apart, and the difference in the time that the same sound impulse takes to reach the different receivers is measured, this serving as a basis for calculating the direction of the source of sound.

The two said known kinds of devices do not permit of the production of a receiving apparatus of small size that can be handled as easily and conveniently as, say, the periscope of a submarine boat.

In distinction from the known devices, the phenomenon utilized for determining the direction of a train of sound waves by the apparatus according to the invention is the polarity or direction of movement of the particles of the medium engaged in conveying the sound, the receiving apparatus being made insensitive to the non-polar compressional effects produced by the sound propagated in the said medium. To accomplish the desired result a "directionally responsive" sound receiving device—i. e. a sound receiving device whose responsiveness is greatest when it is turned so that a certain part of it faces the direction from which the sound proceeds—is used, the dimensions of which may be small in comparison with half a wave length of the sound waves to be received. The receiving device proper may be a suitably constructed microphone, or some other form of detecting device, that is most sensitive to forces acting in a certain direction; or it may consist of a structure that, when excited by the arriving sound energy, oscillates only in a certain well defined direction, as for example a tuning fork.

If the selected directionally responsive detector is a microphone or an imperfect electric contact, the position in which the microphone or contact is placed in the medium will have to be such that the compressional forces engendered by the sound are eliminated or neutralized, whereas the detector with its support is moved as a whole by the moving particles of the sound propagating medium conveying the sound.

The elimination of the effect produced on the receiver by the pressure resulting from the sound in the sound propagating medium is necessary, because the pressure, in contradistinction to the motion of the particles of the medium, has no particular direction, so that, if the compressional component of the sound energy were allowed to operate, a very considerable effect would be perceptible in the receiver that would be superimposed on the effect produced by the motional component, which latter changes according to the position of the receiver. The effect produced by the compressional component is the same in all positions of the receiver and would overshadow the varying responsiveness obtained by turning the receiver in different directions.

The dimensions selected for the apparatus, in one form of the invention, are preferably such that the specific weight of the entire apparatus equals that of an equivalent quantity of the propagating medium, so that it may respond to amplitudes of motion of the medium with the utmost precision. The receiving apparatus can then be caused to respond more or less by turning it, and from this the direction from which the sound proceeds may be inferred.

A particularly simple and effective constructional form of an apparatus according to the invention is obtained by observing the lines laid down by the following consideration:

If a heavy and a light body are suspended so as to be equally movable in a continuous medium, and a motion of the medium occurs, the light body may move with the medium, in cases where the heavy body, on account of its inertia, will remain unmoved. If an apparatus embodying these features is made more or less flat, and is constructed for example by stretching a rubber diaphragm in a thick metal ring suspended freely in the air, it is obvious that motions of the air perpendicular to the plane of the apparatus will cause flexures of the diaphragm, while the ring will, on the whole, remain unmoved. If the air moves in the direction parallel to the plane of the apparatus so as to brush past both sides of the diaphragm, this latter also will remain motionless. Hence the invention also consists in using apparatus of this kind, i. e. of a kind that consists of a constructional element that is heavy, in comparison with the co-vibrating mass of the sound propagating medium, and of another that is light, for determining the direction of sound, and it is characterized by arrangements in which one or more diaphragms or plates, one or both sides of which are exposed to the effects of the sound propagating medium, are stretched out or fixed in very thick and heavy rings or frames, and are made to support at some suitable spot, preferably at their centre, some form of detector, such as a microphone, which is made as light as possible.

A disadvantage of above-described apparatus is that it is bi-directionally responsive or bi-polar, for in turning it through an angle of 360° two equal maxima and two equal minima of loudness will be obtained, the line connecting the maxima on a graduated circle being the line that lies in the direction of the sound producer while the line connecting the minima lies at right angles thereto. In practice, the minima are as a rule used in determining the line in which the sound is traveling, since the position of minimum sound loudness is more marked and since when in this position the plane of the apparatus in most forms of the apparatus extends in the direction in which the sound is traveling. In either case all that is found is a straight line passing through the sound producer and the receiver, which does not enable the particular side of the receiver from which the sound proceeds to be determined. This leads to another feature of the invention.

A known type of sound direction finders consists in sound receivers equipped with sound barriers that prevent the passage of sound waves. This involves the disadvantage that the barriers or sound curtains, if they are to be at all effective, have to be made very large, for since the ordinary receivers are "compressional" receivers (i. e. such as are affected principally by the compressional energy component of the sound waves) and pressure is a non-directed magnitude, all the lines of pressure in a sphere of a radius equal to half a wave length of the particular sound or rate of vibration used for signalling, will tend towards the receiver, irrespective of the direction along which the sound wave travels from the sound producer to the receiver. Hence if sound barriers or the like are combined with receivers of this kind for the purpose of finding the direction of the sound, these barriers will have to have a diameter which is a multiple of the wave length, i. e. their diameter will have to measure several yards, which means of course, that the apparatus will be very unwieldy.

In distinction from these known arrangements a further feature of the invention consists in using small sound barriers in connection with the novel form of receiver foreshadowed above, the barrier being either fixed or movable in respect to the receiver.

According to the invention these barriers may be combined with the receiver in various ways. They can either be interposed at any place in the path of the pencil of sound waves, independently of the movements of the receiver, or a barrier that can be raised and moved concentrically in relation to the receiver proper may be provided, or finally the barrier may be rigidly fixed to the receiver and arranged to be turned with it.

The procedure observed in determining the direction of the sound may be such that the receiver proper is first turned in order to find either the maxima or minima of loudness, according as the apparatus is designed. Then the receiver is adjusted so as to indicate distinctly the position in which its excitation by the sound waves is a maximum, and finally the sound barrier is turned so as to register first at one side of the receiver and then at the other, with the line of direction that has just been found. At the side from which the sound comes the barrier will cause a marked weakening of the loudness perceived.

Some constructional forms of the invention are shown in the drawing in which

Figure 2:
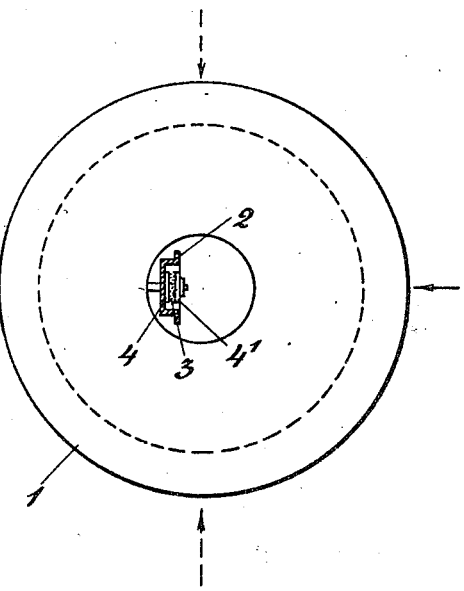
Figure 3:
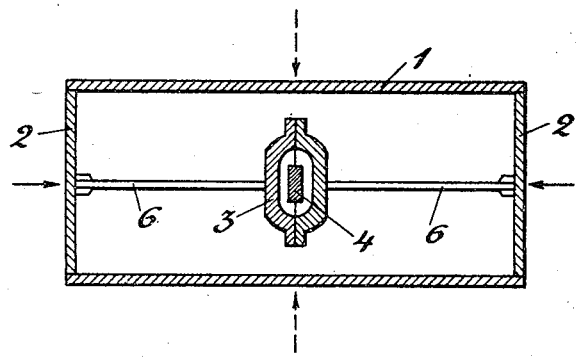
Figure 4:
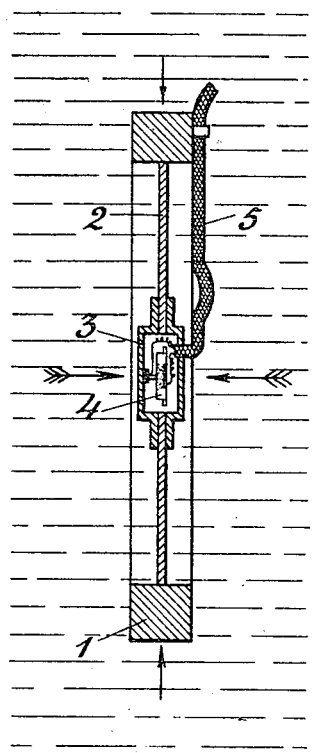
Figure 5:
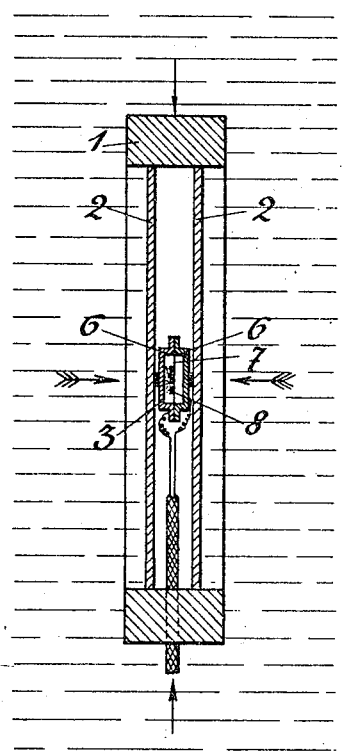
Figure 8:
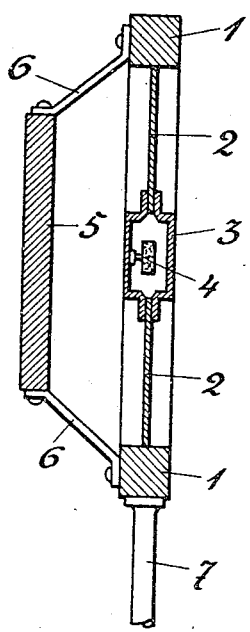
Figure 9:
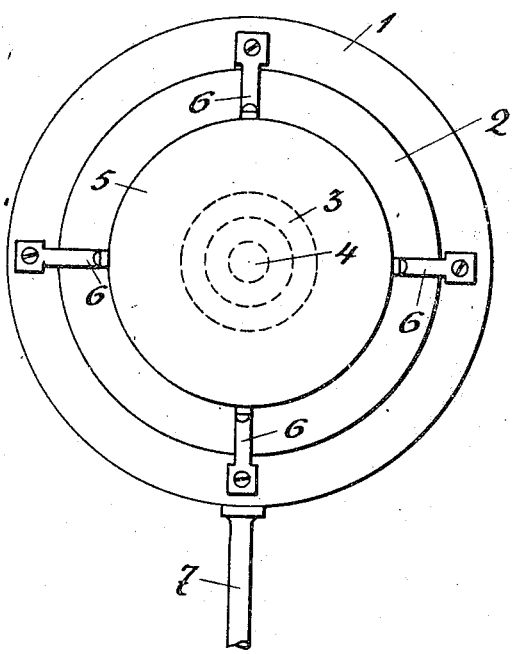
Figure 10:
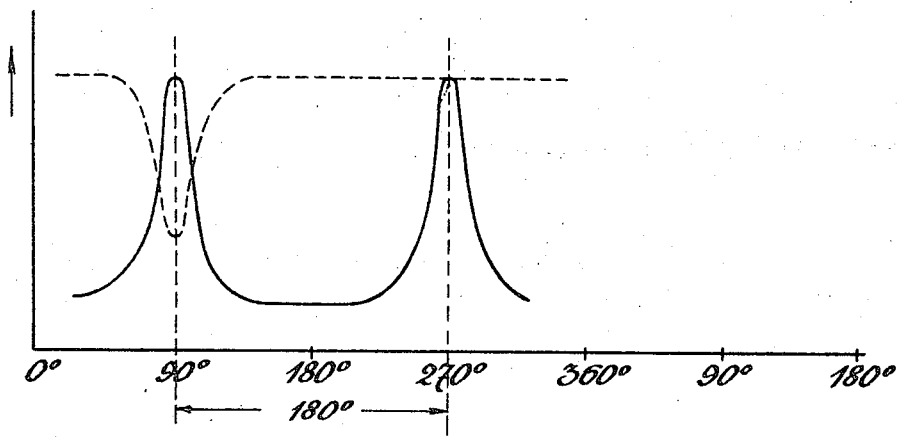

Fig. 1 is vertical section of a simple form of direction finding receiver having a directionally responsive diaphragm microphone, Fig. 2 illustrates a top view of the same apparatus with the top lid removed, the microphone being shown by a section on its middle horizontal line, Fig. 3 shows a type of direction finding apparatus in which the directionally responsive microphone is mounted in a vibratory structure that is also directionally responsive, Fig. 4 represents a direction finding receiver comprising a heavy ring, a diaphragm mounted in this ring, and a directionally responsive microphone placed in a stiff box or capsule arranged in the middle of the diaphragm, Fig. 5 indicates a receiver similar to Fig. 4 except that two diaphragms are mounted in the heavy ring, Fig. 6 is a horizontal section and Fig. 7 a vertical section of a receiver according to Fig. 3 and a sound barrier with which the receiver is equipped, Fig. 8 is a vertical section and Fig. 9 a front view of a receiver according to Fig. 4 and a sound barrier attached to the receiver, Fig. 10 illustrates by loudness-curves the degrees of loudness of the sound perceived with a receiving plant according to Figs. 6 and 7.

Figure 11:
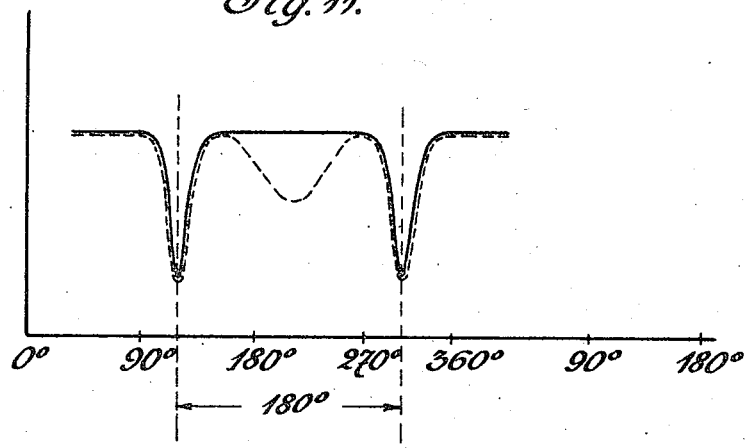

Fig. 11 shows the same curves for a device of the kind represented in Figs. 8 and 9.

The apparatus of Figs. 1 and 2 comprises a heavy ring 1 which is so massive that compressional waves passing over it do not produce any perceptible deformations of the ring at the rates of vibration employed. In practice, a thickness of a few centimeters will be sufficient for a ring of about 10 cms. in diameter. In its interior the ring is equipped with a directionally responsive microphone 2, which may be a standard granulated carbon microphone with a granule chamber 3 and flat electrodes 4, 4'. The hemispheres 5, 5, together with the ring, form an air chamber of such size that the specific weight of the apparatus is just sufficient to eliminate the buoyancy of the water.

If a motional wave acts on the apparatus in the direction indicated by the solid arrows, the apparatus will be moved back and forth and the microphone will be excited on account of the inertia of the free electrode 4' that is mounted on a vibrating diaphragm. But if the wave acts in the direction indicated by dotted arrows the microphone will not respond, or it will respond very feebly.

In Fig. 3, 1 is an air chamber in which two similar elastic rods 6, 6 are attached to two opposite parallel walls 2, these rods carrying a hollow weight 3 at the middle of the chamber. Arranged in the hollow of this weight is a detector 4 of the kind described above. In these types of apparatus the effects of pressure on the detector are counterbalanced and neutralized in all positions of the apparatus because of their equality of phase at the two sides 2, 2. But if the whole vessel is moved to and fro by a motional wave travelling in the direction indicated by one of the solid arrows, one of the rods will be expanded and the other simultaneously compressed, so that the weight with the detector will oscillate in the direction of the bars, i. e. in the direction in which the directionally responsive detector responds.

If the motional wave acts in the direction of the dotted arrows, the movable system consisting of the rods and the weight will execute transverse vibrations and will thus oscillate in a direction in which the detector does not respond.

The efficiency of the apparatus, in receiving waves of a certain length, may be enhanced by so tuning the system composed of rods and a weight that its natural rate of vibration in the longitudinal direction of the rods coincides with the frequency of the exciting sound waves. By tuning in this manner and by so selecting the dimensions of the apparatus that the natural rate of vibration of the transverse oscillations, which would occur when receiving waves traveling in the direction of the dotted arrows, is entirely different from that of the longitudinal waves, so that the transverse oscillations are not produced to the same extent as the longitudinal oscillations, a directional responsiveness is imparted to the entire oscillatory structure. In apparatus of this and analogous kinds it is, of course, also possible to use detectors that are not distinctly directionally responsive.

In Fig. 4, 1 is a thick metal ring equipped with a diaphragm 2. Arranged in a vessel 3 at the middle of the diaphragm is a microphone 4 to which an electric current is conducted by a thin insulated wire 5. Motions of the water such as sound waves travelling in the direction of the feathered arrows will cause the diaphragm to bend back and forth or to oscillate at the rate of the vibration of the waves, but motions in the direction of the unfeathered arrows will leave the diaphragm unmoved.

In the device of Fig. 5 two diaphragms 2 are employed whose centres are connected by the microphone box 3. In this instance the box itself forms the microphone, it being made of two covers 6 which, on the whole, are perfectly stiff and between whose flanges a vibrating diaphragm 7 with an electrode 8 is clamped. In this device it would also be feasible to employ a double acting differential microphone with corresponding electrodes at both sides of the diaphragm. The device operates in the same manner as that shown in Fig. 4. The amplitudes of pressure from the sound in the sound propagating medium are balanced by the rigid box 3 which connects the two diaphragms so that they vibrate as a unit. Directionally responsive receivers of this kind may be strongly damped and used for receiving all manners of sounds or noises, or they may be sharply tuned so as to respond only to certain signals. In accordance with the invention both diaphragms in the constructional form indicated in Fig. 5 may be uniformly or almost uniformly tuned.

It will be obvious that instead of diaphragms other kinds of elements or structures such as rods or cross-bars, bands, etc. may be used.

The particular advantages of apparatus in which such elements are employed consist in the fact that an excellent coupling of the microphone with the propagating medium (water) is obtained, and that the differences between the maxima and minima become exceedingly pronounced.

Figs. 6 and 7 illustrate a device comprising a cylindrical casing 1 closed at both ends by diaphragms 2, 2. Attached to the diaphragms are rods 3, 3 which support at the middle a rigid box 4 that acts as a weight and contains a microphone 5. The casing 1 is supported by a pillar or shaft 8 by which it can be turned in a horizontal plane. A sound barrier 7, supported upon an arm 6 fixed to a pipe 9 that surrounds the pillar 8, is arranged to be turned around the receiver. The barrier is preferably arranged to be swung up and down on a pivot in the arm 6.

The procedure followed in ascertaining the direction of the sound is as follows: When the sound barrier is swung down and the receiver is turned, the loudness perceived in the telephone receiver (not shown) will vary in accordance with the solid graph shown in Fig. 10, in which the abscissas represent angles or degrees and the ordinates denote the varying loudness of the sounds heard.

The loudest sound is heard when the direction of the rods coincides with that of the sound producer. The positions in which the greatest loudness is perceived are noted on a graduated circle. The line drawn through these points will be the line of direction of the sound producer, but it will be bi-directional. The receiver is now left in one of the two positions of maximum loudness and the sound barrier is raised and moved past the diaphragms 2, 2. It will be found that at one side a diminution of loudness in accordance with the broken curve of Fig. 10 is produced by the sound barrier.

The device shown in Figs. 8 and 9 comprises an annular hard and heavy body 1, in which a diaphragm 2 is fixed. 3 is a box fixed at the middle of the diaphragm and containing a microphone 4. At one side of the diaphragm at a suitable distance therefrom a sound barrier 5 is fixed by means of slender stays 6. The apparatus is held by a support 7.

If this receiver were turned without the said barrier, a loudness curve as shown by the solid graph in Fig. 11 would be obtained wherein the abscissas represent angular degrees and the ordinates represent loudnesses. But the barrier by opposing the amplitudes of motion of the medium produces a diminution of the maximum loudness at the side turned towards the sound producer. These variations of loudness are shown by the dotted curve.

A graduated circle for taking the readings will also be preferred in this instrument.

The invention may be employed in water or in the air for all manners of sounds, no matter whether they are signal notes or mere noises.

I claim:

1. In apparatus for determining the direction of sound, sound receiving means responsive to the movements of the particles of the sound propagating medium and unresponsive to the compressional component of the sound waves.

2. In apparatus for determining the direction of sound, sound receiving means comprising a body responsive to the movements of the particles of the sound propagating medium and unresponsive to the compressional component of the sound waves, and a sound detector actuated by the said body.

3. In apparatus for determining the direction of sound, sound receiving means comprising a vibratory structure responsive to the movements of the particles of the sound propagating medium and unresponsive to the compressional component of the sound waves, and a detector actuated by said vibratory structure.

4. In apparatus for determining the direction of sound, sound receiving means comprising a diaphragm responsive to the movements of the particles of the sound propagating medium and unresponsive to the compressional component of the sound waves, and a sound detector actuated by the said diaphragm.

5. In apparatus for determining the direction of sound, sound receiving means comprising a body responsive to the movements of the particles of the sound propagating medium and unresponsive to the compressional component of the sound waves, and a directionally responsive sound detector actuated by the said body.

6. A sound signal receiving apparatus having a portion possessed of such a small amount of inertia and so arranged in the sound propagating medium that this portion is responsive to the movement of the particles of the medium and is substantially unresponsive to the pressure fluctuations in the medium.

7. A sound signal receiving apparatus having a portion possessed of such a small amount of inertia that this portion is responsive to the movement of the particles of the sound propagating medium, and is so arranged in the medium that the pressure fluctuations acting on it are balanced.

8. A sound signal receiving apparatus comprising a portion having two oppositely disposed surfaces possessed of such a small amount of inertia and so arranged in the sound propagating medium that this portion is responsive to the movement of the particles of the medium and is substantially unresponsive to the pressure fluctuations in the medium, and means for screening off the movement of the particles from one of said surfaces.

9. In apparatus for determining the direction of sound, sound receiving means responsive to the movements of the particles of the sound propagating medium and unresponsive to the compressional component of the sound waves, said sound receiving means being small in comparison with half a wave length of the sound waves received.

10. In apparatus for determining the direction of sound, sound receiving means responsive to the movements of the particles of the sound propagating medium and unresponsive to the compressional component of the sound waves, the weight per unit volume of the active portions of the receiving means being approximately equal to that of the water displaced by it.

11. In apparatus for determining the direction of sound, sound receiving means comprising a vibratory body responsive to the movements of the particles of the sound propagating medium and unresponsive to the compressional component of the sound waves, and a sound detector actuated by said vibratory body, said vibratory body being tuned to the frequency of the sound signals employed.

12. In apparatus for determining the direction of sound, sound receiving means comprising an inertia ring, a diaphragm in the said ring, a rigid box at the middle of the diaphragm, and a microphone in said box, the diaphragm and box being responsive to the movements of the particles of the sound propagating medium and unresponsive to the compressional component of the sound waves.

13. In apparatus for determining the direction of sound, sound receiving means comprising an inertia ring, a diaphragm in the said ring, a rigid box at the middle of the diaphragm, and a directionally responsive microphone in said box, the diaphragm and box being responsive to the movements of the particles of the sound propagating medium and unresponsive to the compressional component of the sound waves.

14. In apparatus for determining the direction of sound, sound receiving means comprising an inertia ring, a diaphragm in said ring, a rigid box at the middle of the diaphragm, and a microphone in said box, the diaphragm and box being responsive to the movements of the particles of the sound propagating medium and unresponsive to the compressional component of the sound waves, and the microphone being especially responsive when moved in a direction perpendicular to the plane of the diaphragm.

15. In apparatus for determining the direction of sound, sound receiving means comprising an inertia member, a diaphragm carried thereby open to the sound propagating medium on both surfaces and responsive to the movements of the particles of the sound propagating medium, and a microphone adapted to be actuated by said diaphragm.

16. In apparatus for determining the direction of sound, sound receiving means responsive to the movements of the particles of the sound propagating medium and unresponsive to the compressional component of the sound waves, and a sound barrier for screening a portion of said sound receiving means.

17. In apparatus for determining the direction of sound, sound receiving means responsive to the movements of the particles of the sound propagating medium and unresponsive to the compressional component of the sound waves, and a sound barrier for screening a portion of said sound receiving means rigidly fixed with relation to said means, said means being adapted to turn with the barier about a vertical axis.

18. In apparatus for determining the direction of sound, sound receiving means comprising an inertia ring, a diaphragm fixed in the said ring, a rigid box at the middle of the diaphragm, a microphone in said box, the diaphragm and box being responsive to the movements of the particles of the sound propagating medium and unresponsive to the compressional component of the sound waves, and a sound barrier rigidly attached to said sound receiving means, the latter together with the sound barrier being adapted to be turned about a vertical axis.

In testimony whereof we affix our signatures.

WILHELM RUDOLPH.
ALARD DU BOIS-REYMOND.